US012221902B2

(12) United States Patent
Ertl et al.

(10) Patent No.: US 12,221,902 B2
(45) Date of Patent: Feb. 11, 2025

(54) CONNECTING STRUCTURE FOR LOAD TRANSFER

(71) Applicant: MTU Aero Engines AG, Munich (DE)

(72) Inventors: Franz-Josef Ertl, Munich (DE); Michael Cipollone, West Hartford, CT (US)

(73) Assignee: MTU Aero Engines AG, Munich (DE)

( * ) Notice: Subject to any disclaimer, the term of this patent is extended or adjusted under 35 U.S.C. 154(b) by 0 days.

(21) Appl. No.: 18/157,908

(22) Filed: Jan. 23, 2023

(65) Prior Publication Data

US 2023/0235676 A1 Jul. 27, 2023

(30) Foreign Application Priority Data

Jan. 25, 2022 (DE) ........................ 102022101661.7

(51) Int. Cl.
*F01D 9/04* (2006.01)

(52) U.S. Cl.
CPC .......... *F01D 9/042* (2013.01); *F05D 2220/32* (2013.01)

(58) Field of Classification Search
CPC ............................ F01D 9/042; F05D 2220/32
See application file for complete search history.

(56) References Cited

U.S. PATENT DOCUMENTS 6,181,978 B1 * 1/2001 Hinds .................... G06T 17/20 700/98
9,982,548 B2 5/2018 Ols et al.
10,309,241 B2 * 6/2019 Bailey .................. F04D 29/522
10,633,990 B2 4/2020 Olson et al.
2004/0081548 A1 * 4/2004 Zess ..................... F04D 29/681 415/914
2005/0081548 A1 4/2005 Lee et al.
2006/0233641 A1 10/2006 Lee et al.
2013/0224027 A1 8/2013 Barr et al.
2015/0044046 A1 2/2015 Shteyman et al.
2016/0273362 A1 9/2016 Li et al.
2017/0009587 A1 * 1/2017 Szymanski .......... F04D 29/324
2017/0370283 A1 12/2017 Dynak et al.
2020/0123918 A1 4/2020 Duong et al.

(Continued)

FOREIGN PATENT DOCUMENTS

DE 102018209608 A1 12/2019

OTHER PUBLICATIONS

C. Mattheck et al.: Shape Optimization the Easy Way: The 'Method of Tensile Triangles', Int. Journal of Design & Nature. vol. 2, No. 4 (2007) 301-309.

(Continued)

*Primary Examiner* — David E Sosnowski
*Assistant Examiner* — Theodore C Ribadeneyra
(74) *Attorney, Agent, or Firm* — Davidson Kappel LLC

(57) ABSTRACT

A connecting structure (10) for load transfer, in particular in a gas turbine (1), including a strut (20) and at least one wall element (30) is provided. The strut (20) at one end is integrally joined to the wall element (30), and the strut (20) and the wall element (30) are enclosed by a fillet (40), at least in areas, and integrally joined to same. An elastic deformation of the involved elements of the structure during the load transfer and/or load absorption is improved in that a root section (50) that is formed by a ridge (56) and that extends from the strut (20) to the wall element (30) is situated on the fillet (40).

9 Claims, 6 Drawing Sheets

(56) References Cited

U.S. PATENT DOCUMENTS

| | | | |
|---|---|---|---|
| 2020/0248574 A1 | 8/2020 | Reisch et al. | |
| 2020/0318495 A1 | 10/2020 | Kassab et al. | |
| 2022/0186622 A1 * | 6/2022 | Lecuyer | F01D 9/02 |

OTHER PUBLICATIONS

Pinho de Castro, et al : A note on notch shape optimization to minimize stress concentration effects Theoretical and Applied Fracture Mechanics, vol. 84, Aug. 2016, pp. 72-85.

"Creating Tritangent Shape Fillets," (2021) webpage: https://catiahelp.azurewebsites.net/English/GsdUserMap/gsd-1-Operations-TritangetShapeFillet.htm, last downloaded on Jan. 9, 2023.

* cited by examiner

CONNECTING STRUCTURE FOR LOAD TRANSFER

This claims the benefit of German Patent Application DE 102022101659.5, filed on Jan. 25, 2022. The entire disclosure of which is hereby incorporated by reference herein.

BACKGROUND

The present invention relates to a connecting structure for load transfer in a gas turbine. These types of connecting structures include a strut which at one end is integrally joined to at least one wall element, and that is enclosed there by a fillet in a likewise integrally joined manner.

The connecting structures are used, for example, in gas turbines, in particular aircraft engines, and in particular in a bearing seal housing of a turbine intermediate housing there.

Specific examples of applications of connecting structures are bearing seal housings that must absorb heavy loads and elastic deformations, since with their struts designed as supports they transfer and absorb the forces from the shaft bearings in the direction of the outer housing of the gas turbine. Further examples in which a fillet connects a strut and a wall element to one another are the blades of a rotor or a stator situated in the flow for absorbing and transferring aerodynamic forces, even if the blades are generally not referred to as a support. The blades, the supports, and the inner wall of the rotor situated on the hub side, or the inner wall and/or the outer wall of the stator, is/are examples of the wall element. In particular, the absorption of highly dynamic forces and/or great stresses due to high temperature gradients generates local maximum load positions, which are counteracted in the fillet with appropriate additional mass. The struts of the connecting structure in an intermediate duct, in particular in an intermediate compressor duct/turbine intermediate housing, are a further example of an application, the supports being used for absorbing aerodynamic forces and also for load transfer of bearing forces from the housing to the shaft. In the latter example, the struts are connected at both ends to a wall element, and at both ends are enclosed by a fillet that has a thicker design, in particular in a front area.

The fillet generally has a reinforced design for reducing stress peaks at the locations of the greatest elastically occurring deformations, i.e., the local maximum load positions.

SUMMARY OF THE INVENTION

One disadvantage is that such fillets are thus provided with greater mass and are heavier.

It is an object of the present invention to provide a connecting structure for load transfer, so that the elastic deformation behavior of the involved elements of the connecting structure during the load transfer is improved.

The present invention provides a connecting structure.

A connecting structure according to the present invention for load transfer, in particular in a gas turbine, for example between a hub area and a housing area through a flow channel or within a hub area, for example in a bearing seal housing, includes a strut and at least one wall element. The strut at one end is integrally joined to the wall element. The strut and the wall element are enclosed by a fillet, at least in areas, and are integrally joined to same.

According to the present invention, it is provided that at least one root section formed by a ridge with a comb is situated on the fillet. Multiple root sections may be provided.

By use of a root section, it is particularly advantageous that the rigidity of the fillet may be locally increased in a targeted manner, and the fillet may have a flatter and wider design. The root section has an advantageous anchor effect on the fillet which is integrally joined to the wall element. The root section extends along a line that connects points of circumferential lines having a maximum curvature, i.e., including the comb of the ridge. The comb is a longitudinal extension of the root. The comb is a measure for a root longitudinal extension of the root section, and has a constant or varying course direction. The increased extension of the surface due to the ridge effectuates increased rigidity in the connecting structure according to the present invention, and thus advantageously allows a better power flow in the root section. It has been shown that, due to the better power flow in the root sections of the fillet, in particular lateral to the strut, lower stresses advantageously occur at the front edge of the strut that is actually acted on by the highest stresses, and in addition stress peaks are advantageously reduced. The rigidity is a measure for the elastic deformability of an element. In addition, a targeted, locally limited, increased force transmission may advantageously take place due to the root sections, so that the load transfer may advantageously be improved overall in a simple manner. The present invention may in particular be transferred to all examples of connecting structures mentioned in the introduction, in order to improve the elastic deformation behavior of these connecting structures.

The fillet may have a beltlike surface. The beltlike surface may have the shape of a closed or open belt. Thus, it may be provided that the strut and the wall element at their rear edge have a shared section plane that includes no fillet. This means that the beltlike surface of the fillet ends at the intersection edges of the section plane and is open there. The beltlike surface of the fillet may have an at least partially, preferably completely, concave design along its longitudinal extension between the strut and the wall element. In addition, a wall element may be integrally joined to the strut, in each case at both ends of the strut, in that case two fillets being provided and each fillet being integrally joined to a wall element and to the strut. The strut surface may have a circular, elliptical, or drop-shaped cross section, which is structurally extruded up to the wall element. The strut, corresponding to its cross section, may have a cylindrical, ellipsoidal, or blade-shaped strut body. The strut may be hollow, it being advantageously possible for the strut body to be a solid body in the area of the fillet. The strut in particular stands perpendicularly on the wall element. It may be provided that the strut is angled with respect to the wall element, and in particular encloses an angle in the range of 60° to 120° with respect to the wall element. The wall element or the wall elements may be or have flat surfaces or an inwardly or outwardly curved cylindrical wall element surface. The wall element may be a hollow cylinder, on the circumferential surface of which the fillet is situated. However, the wall element may also be a cylinder segment that provides a concave or convex surface for connecting the strut and the fillet.

The root section and the fillet, as illustrated in FIG. 7, for example, may be equally divided with reference to a grid. This convention allows a more accurate description of the properties of the freeform surfaces of the fillet and of the root sections.

On the one hand, the grid is formed by a plurality of uniformly distributed cross-sectional planes whose normal is directed in parallel to the longitudinal extension of the strut. The cross-sectional planes intersect the contour of the fillet, and the intersection lines thus created form the circumferential lines of the fillet and the adjoining areas of the strut and of the wall element.

On the other hand, fillet width lines are drawn in the fillet which extend between a first edge of the fillet at the strut, a fillet neck, and a second edge of the fillet at the wall element, a fillet foot. A fillet width line is a shortest line that extends along the surface of the fillet, from an edge point of the fillet at the strut to a next closest edge point at the wall element, without intersecting other fillet width lines.

Table 1 below may be used to define edges or boundaries between tangentially merging surfaces, each of which forms a side for one of the edges:

TABLE 1

Points on the tangentially merging surfaces used as edge points of the fillet with respect to the strut or the wall element

| | 1st side | | |
|---|---|---|---|
| 2nd side | Concave | Straight | Convex |
| Concave | Change in the curvature without a change in algebraic sign | Beginning of curvature on 2nd side | Change in algebraic sign of the curvature |
| Straight | Beginning of curvature on 1st side | No edge or step | Beginning of curvature on 1st side |
| Convex | Change in algebraic sign of the curvature | Beginning of curvature on 2nd side | Change in the curvature without a change in algebraic sign |

The cases with a change in algebraic sign of the curvature, i.e., concave/convex, or the transition from a curved, i.e., convex or concave, surface to a straight surface, are visually recognizable.

It is not meaningful to define an edge between two straight adjacent surfaces, since the edge would not be recognizable at all unless it were a step. In the present invention, by definition at least one of the sides is always curved.

In the cases in which two concave or two convex surfaces adjoin one another, due to the surfaces which are curved per se it is not trivial to recognize the edges. This is the case, for example, for a connecting structure when the strut has a forward sweep and is also concavely curved in this direction, or when two concave transition areas enclose the strut along its longitudinal extension to the extent that they abut one another. Therefore, the following rules are defined for delimiting the elements in these cases: For defining the elements, the longitudinal axis of the strut is considered, and used as the reference axis. If there is a local minimum of the surface line with respect to the longitudinal axis, the edge point is situated on the local minimum. The remaining points of the first edge are correspondingly computed. The elements of the connecting structure may be delimited from one another in this way. A further, nontrivial case may occur in a connecting structure in which a cylindrical wall element is concavely curved inwardly, for example for a strut that is connected to a cylindrical outer housing as a wall element. On the second edge there are then two leveling points at which the surface transitions from a concavely curved surface of the fillet into a straight line on the wall element surface that extends normally with respect to the second edge. All other points on the second edge, due to the concave curvature of the wall element, have two sides with the same algebraic sign of the curvature. The absolute radius of curvature at the leveling point on the surface of the fillet is then used as a reference curvature, and all lined-up points whose absolute curvature is minimal, taken together, form an edge and are defined as the edge points. A line that is found in this way may also be used to determine the second edge when particular wall surface contours (endwall contouring) are/is provided on the wall element. In particular, the wall surface contour may be designed in such a way that it relays or distributes the forces from the root sections. It may be advantageous for the root section and an elevation on the wall element surface to adjoin one another. Due to the different possible edge profiles, the edges may intersect the circumferential lines. The edges are used as a support of fillet width lines, and thus for ascertaining the fillet width.

All adjacent circumferential lines, projected relative to one another onto the longitudinal extension of the strut, have the same projected distance as all other adjacent circumferential lines. This projected distance is the height gradation of the grid. The number of height gradations is a measure for the fineness of the grid, and may be adapted as needed. The more finely the grid is selected, the more accurate is the estimate for the value of the extension.

The root section, together with the ridge and the comb along a considered circumferential line of the fillet, forms a convex protrusion that is delimited by two concave sections having a concave profile of the circumferential line. There are two further points with curvature maxima in these concave sections. These curvature maxima have an algebraic sign of curvature that is opposite that of the curvature of the comb, and delimit a root width of the root section that is to be measured along the considered circumferential line. The two further points are end points of the width line of the root section. Lined up, the end points of all width lines of the root section form root boundary lines. Since a concave section is likewise present between two directly adjacent root sections, the curvature maxima in the concave section on the circumferential line are also suitable for distinguishing between two adjacent root sections.

An extension is a local dimensionless value. It is computed from the square root of a sum of the square of a smallest distance, projected onto one of the cross-sectional planes, between two intersection points of circumferential lines along a fillet width line, and the square of the height gradation.

The extension of the root section correspondingly results from the square root of a sum of the squares of a projected distance between two adjacent intersection points of circumferential lines along the comb, and the height gradation. The extension may vary along the comb. An average extension of the root section may be formed by adding all formed extensions along the comb and then dividing by the number of height gradations of the grid.

Along the circumferential course of the fillet, there may be further fillet width lines or other line courses with maximal curvatures which are not a root section, but, rather, which result from a basic shape of the fillet adapted to the contour of the strut. For example, the basic shape of the fillet results from the contour of an elliptical strut, which as a basic shape has an ellipse with two points of a local maximal curvature, and the fillet being adapted to this basic shape. For the sake of simplicity, these line courses are referred to below as regular extreme lines. A regular extreme line may coincide with the comb of a root section, the surface of the fillet having an increased extension with respect to the basic shape of an extreme line. The root extension may be increased by at least 20%, in particular at least 50%, preferably at least 100%, and particularly preferably by 150%, and at most by 2000%, in particular by 1500%, preferably by 1000%, and particularly preferably by 500%, with respect to an extension of the regular extreme lines. In addition, the average extension of the root section is particularly advantageously increased, with respect to an average extension of the regular extreme lines, by at least 20%, in particular at least 50%, preferably at least 100%, and particularly preferably by 150%, and at most by 2000%, in particular by 1500%, preferably by 1000%, and particularly preferably by 500%.

In a first preferred specific embodiment, it is provided that the root section widens the fillet on the surface of the wall element by at least 5%, in particular 10%, and/or that the root section widens the fillet on the surface of the strut by at least 5%, in particular 10%. The hold of the fillet on the wall element or at the strut is thus advantageously improved, and an absorbable torque of the connecting structure is increased.

The comb correspondingly extends at least over 50% of a minimal fillet width, in particular 65% of the minimal fillet width, preferably over 80% of the minimal fillet width, of the fillet. An increased power flow along the root section which counteracts an elastic deformation at the remaining locations on the connecting structure is thus advantageously possible. If the fillet has a continuously concave curvature between the first edge and the second edge, the root section particularly preferably extends over the area of the greatest concave curvature transverse to the circumferential lines of the fillet. An additional area for a power flow from the strut to the wall element is thus created. As the result of a circumferential line that is defined along the greatest curvature in the fillet, the fillet may be divided into two portions: a first fillet portion facing the strut, and a second fillet portion facing the wall element. The root section may have a greater extension in a second fillet portion. Additionally or alternatively, an average value of the extension of the second fillet portion extending transversely with respect to the beltlike fillet may be greater than an average value of the extension of the first fillet portion extending transversely with respect to the beltlike fillet.

In a further preferred second specific embodiment, an extension of the comb between two adjacent circumferential lines of the fillet with respect to an extension of the fillet outside a root section, in particular an extension at a root boundary line, between the two circumferential lines is increased in particular by at least 1% and by at most 5%, preferably by at least 2% and by at most 4%. The power flow along the root section is advantageously increased due to increasing the extension. The root section may further preferably have a very flat design, so that on the one hand it introduces very little or no aerodynamic disturbance into a flow channel, and on the other hand introduces little additional mass while at the same time providing additional rigidity in the connecting structure.

In a third specific embodiment and refinement of the connecting structure, it is provided that the extension of the comb in an area of the root section closer to the wall element is greater than in an area of the root section closer to the strut. A particularly advantageous specific area of increased rigidity is thus created, as the result of which a particularly good distribution of the forces is made possible. The extension of the comb along the comb from the strut to the wall element may follow a monotonically increasing function, in particular an exponential function or parabolic function.

In one preferred refinement of the connecting structure, it is advantageously provided that the extension of the root section in the vicinity of the first edge is smaller than in the vicinity of the second edge, in particular that the extension of the root section in the area of the first 10% of a total extension of the comb adjacent to the first edge is smaller than in the area of the last 10% of the total extension of the comb adjacent to the second edge. The intensity of the power flow along the root section may thus be controlled in a targeted manner, with the provided configuration in particular in a section on the wall element, a particularly good power flow being made possible, and stresses thus being transferred to and distributed on the wall element rather than to/on the strut. It may also be advantageously provided that a maximal extension of the comb is situated in a middle portion, in particular the middle 10%, of the total length of the comb, so that the power flow in a middle area of the fillet is increased.

In a preferred fourth specific embodiment, it is provided that the comb has a course direction and an in particular averaged root angle with respect to a transverse direction of the strut, the root angle being in a range of −80° to +80°, in particular in the range of −45° to +45°, particularly preferably in the range of −30° to +30°. A power flow away from a front edge or rear edge of the strut is thus made possible in a particularly simple but surprising manner, so that particularly desirable lower stress occurs at the front edge or rear edge of the strut. The angle may preferably vary along the comb and may become larger or smaller, so that a power flow may be advantageously directed from locations under particular load at the fillet, the strut, or the wall element.

In one preferred refinement, the root section is spaced a minimal first distance or second distance from the first edge and/or the second edge. The first distance preferably corresponds to at least 10%, particularly preferably at least 5%, and even more preferably at least 3%, of the minimal fillet width. The second distance preferably corresponds to at least 10%, particularly preferably at least 5%, and even more preferably at least 3%, of the minimal fillet width. In this way, forces are advantageously locally distributed in the fillet, and the less curved surfaces present in the vicinity of the edges of the fillet are utilized to reduce stresses and counteract elastic deformations without the need for additional material to increase the rigidity in these areas.

In a fifth preferred specific embodiment, it is provided that the root width extends over at least 10%, in particular at least 5%, particularly preferably at least 3%, of the circumferential line, and/or that the root width extends over at least 10%, in particular at least 5%, particularly preferably at least 3%, and at most 15%, in particular at most 20%, particularly preferably at most 30%, of a total length of the comb of the ridge of the root section. These areas are advantageously particularly stable, and reduce the stresses in the remaining areas of the fillet in a particularly advantageous manner. Alternatively or additionally, it may be provided that the root width, at least along 70% of the total length of the comb, has a profile that varies by less than 5%. Due to such a constant width of the profile of the root section, the power transmission may be concentrated on areas which are not exposed to heavy load and which therefore may also contribute to the power transmission.

A sixth preferred specific embodiment of a connecting structure is characterized in that the root section is situated at a distance from a local highest load position at the strut, at the wall element, or at the fillet, in particular at a distance from a local highest load position in the axial direction in front of a front edge of the strut and/or from a local highest load position in the axial direction behind a rear edge of the strut. A local highest load position may be ascertained using a finite element method, for example, the stresses in the component being at a local highest at the local highest load position. This design, which might seem disadvantageous at first glance, has an alternative power flow which at the highest load position particularly advantageously reduces an elastic deformation of the connecting structure under load.

In a seventh specific embodiment, the connecting structure is designed in such a way that the fillet is divided into two sides by a plane, in particular a meridian plane, and the at least one root section is situated completely on one of the two sides of the spanned meridian plane. In the present description, reference is also made to the expressions "lateral to the strut" or "on/at one side of the strut." In this way, the design of a thin section of the fillet in front of the front edge and behind the rear edge of the strut is surprisingly made possible, even though the greatest stresses occur there, and these locations have generally been provided with a higher mass.

In an advantageous eighth supplemental specific embodiment, it is provided that a plurality of root sections, in particular at least three root sections, particularly preferably four root sections, are situated at least on each of the two sides, that in particular a first root section of the plurality of root sections is situated on one side of the separating plane and a second root section of the plurality of root sections is situated on the other side of the separating plane, in particular symmetrically with respect to the first root section, and/or that a third root section of the multiple root sections is situated on one side of the separating plane and a fourth root section is situated on the other side of the separating plane, in particular symmetrically with respect to the third root section. In this way, a majority of the power flow and thus of the occurring stresses may be easily situated in the lateral area of the strut and of the fillet, which advantageously reduces the loads in a front portion and rear portion of the strut.

In a ninth specific embodiment, the fillet may also preferably be designed in such a way that at least an even number of root sections as root section pairs are situated on each of the two sides, in particular that the two root sections of each root section pair are situated symmetrically with respect to the spanned meridian plane and/or enclose an angle between 20° and 160° relative to one another. The two root sections of each root section pair are preferably situated at a similar height in the axial direction at the side of the strut, so that a balanced stress state is advantageously achieved. In particular, the two root sections of each root pair are situated symmetrically with respect to the spanned meridian plane.

In addition, in one preferred refinement the root section is designed in such a way that the root section branches at least once and forms multiple root subsections. Thus, areas of greater stress may be simulated or encompassed in an early design state, which after iterations may result in a better solution for the power flow.

In one embodiment, at least or exactly three or at least or exactly four root sections, each formed by a ridge with a comb and in each case branched or unbranched, and which in each case extend from the strut to the wall element, are situated on the fillet, of the three or four root sections, at least two root sections in succession around the strut, in particular in each case two root sections in succession around the strut, extending with respect to one another at an angle in the range of 80° to 170°.

In one embodiment, the strut at one end opposite from the end is integrally joined to a further wall element and is designed, intended, and/or suited for load transfer between the wall element and the further wall element.

According to the present invention, a gas turbine, in particular an aircraft engine, may include one or multiple connecting structures described above. The connecting structure may be situated in an inlet housing, outlet housing, or intermediate housing in the compressor or turbine area, for example in a turbine intermediate housing of an aircraft engine and/or in a bearing area. In one embodiment, the connecting structure is situated in a bearing seal housing of a turbine intermediate housing.

One of the two wall elements may be situated on the hub side of a flow channel of the gas turbine, and the other of the two wall elements may be situated on the hub side or on the housing side of the flow channel.

One or both of the wall elements may be part of an integral, uninterrupted ring that is segmented or unsegmented in the circumferential direction.

The strut(s) may be designed, intended, and/or suited for load transfer between a first and a second stator component, it being possible for one of the two stator components to be situated on the hub side of a flow channel of the gas turbine, and the other of the two stator components to be situated on the hub side or on the housing side of the flow channel.

For describing the geometries present in the gas turbines or aircraft engines, three main directions and main axes coinciding with same are defined. The first main direction extends in the direction of the engine rotational axis and is also referred to as the engine longitudinal axis or axial axis, which extends in the axial direction. The first main direction establishes a front and a rear of the geometry considered in each case, in relation to gas turbines the inlet of the flow gas being the front, and the outlet of the flow gas being the rear. The second main direction extends along a direction perpendicular to the engine rotational axis, and is also referred to as the radial axis, which extends in the radial direction. The second main direction determines an exterior and an interior of the engine, the engine axis being inwardly situated, and the radial direction being outwardly directed from the engine longitudinal axis. The third main direction extends in the circumferential direction of the gas turbine, perpendicularly with respect to the two other main directions. The three main directions of the gas turbine together determine three types of main planes: meridian planes, which are spanned by the axial axis and in each case a radial axis; circumferential planes, which are situated on a cylinder lateral area about the rotational axis, spaced apart by a certain radius; cross-sectional planes of the engine, which are situated normally with respect to the engine longitudinal axis.

The present invention is explained in greater detail with reference to the following drawings, based on several preferred exemplary embodiments, in particular via further advantages and features.

Figure 6C:
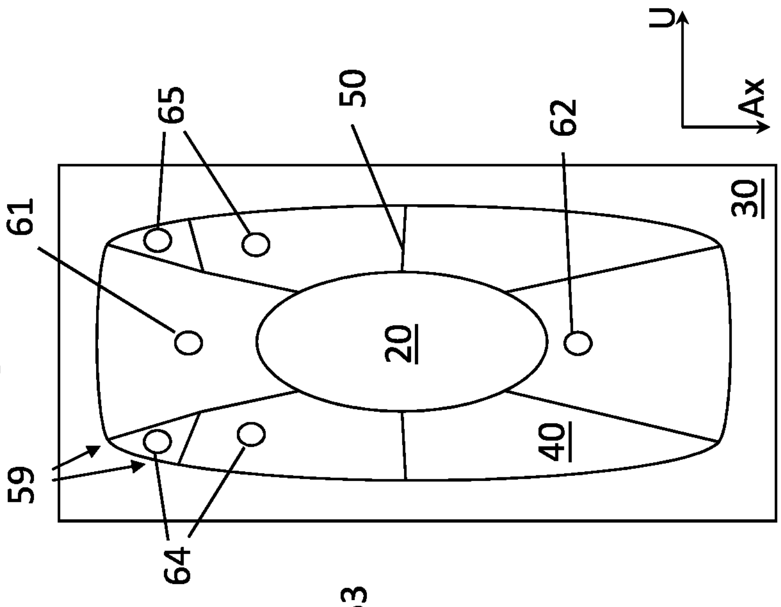
Figure 6B:
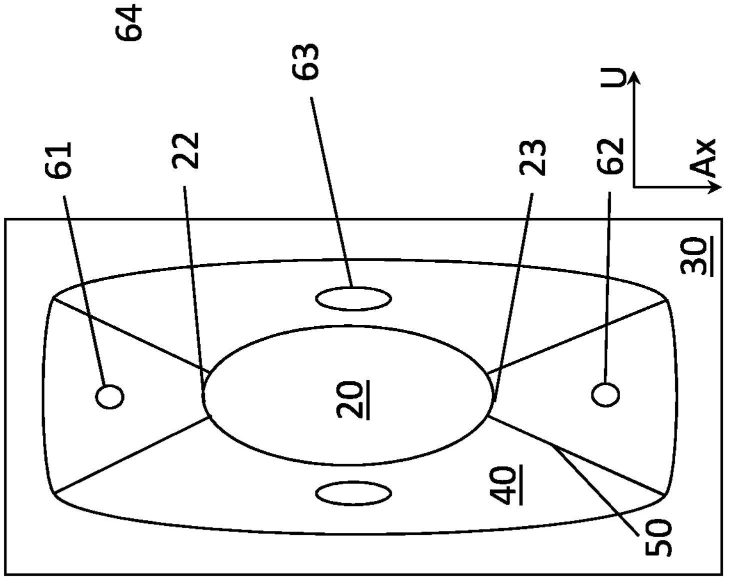
Figure 6A:
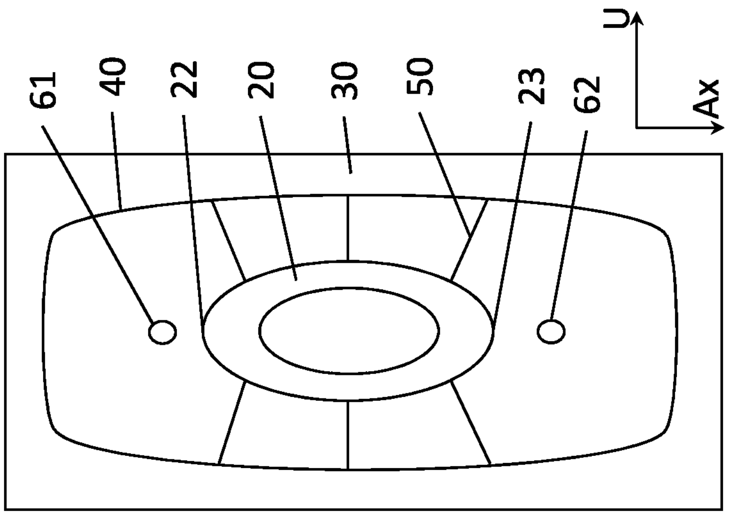
Figure 7:
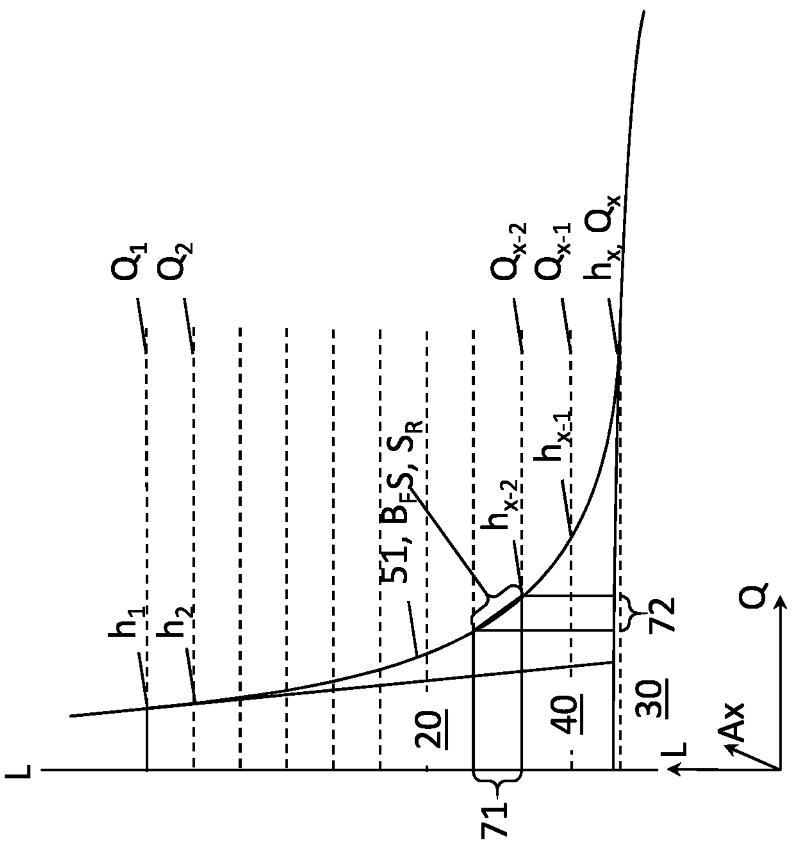

FIGS. 6a, 6b, and 6c each show further preferred exemplary embodiments with different local highest load positions relative to the root sections; and FIG. 7 shows an example diagram of a grid that describes the fillet.

Figure 1:
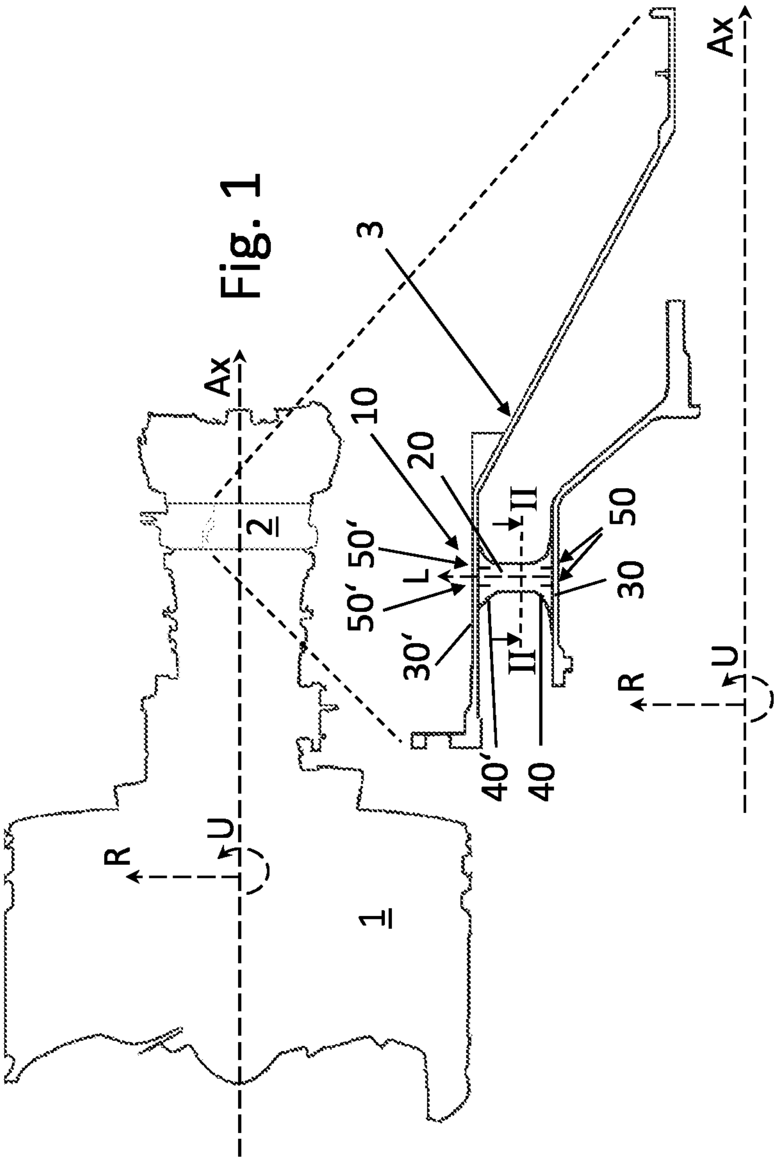
FIG. 1 shows an overview of a schematically illustrated gas turbine in a side view with a first exemplary embodiment of a connecting structure according to the present invention.

FIG. 1 shows an overview of a schematically illustrated gas turbine 1 that is designed as an aircraft engine, including a turbine intermediate housing 2 and a bearing seal housing 3, illustrated in a comparatively larger scale, in which a first exemplary embodiment of a connecting structure 10 according to the present invention is situated. Gas turbine 1 and its components and elements may be defined via the three main directions of the gas turbine, namely, axial direction Ax, which coincides with the rotational axis of the gas turbine, radial direction R, which is perpendicular to the rotational axis and extends from the inside to the outside, and circumferential direction U about the rotational axis in the rotational direction.

Connecting structure 10 includes a strut 20 as well as a lower wall element 30 and an upper wall element 30', the two wall elements 30, 30' being connected to strut 20 by a continuous lower fillet 40 and an upper fillet 40', respectively. Wall elements 30, 30' extend cylindrically in circumferential direction U. Fillets 40, 40' enclose strut 20 and merge into corresponding wall element 30, 30'. Strut 20 has a longitudinal axis L in parallel to its longitudinal extension. In alternative specific embodiments, strut 20 and its longitudinal axis L may also be tilted obliquely to the front, to the rear, and/or to the side relative to wall element 30 and axial direction Ax. Lower wall element 30 has an outwardly curved, convex surface, whereas upper wall element 30' has an inwardly curved, concave surface.

According to the present invention, root sections 50, 50' are provided on the two fillets 40, 40', respectively, so that the rigidity of fillets 40 is increased in these areas.

Figure 3:
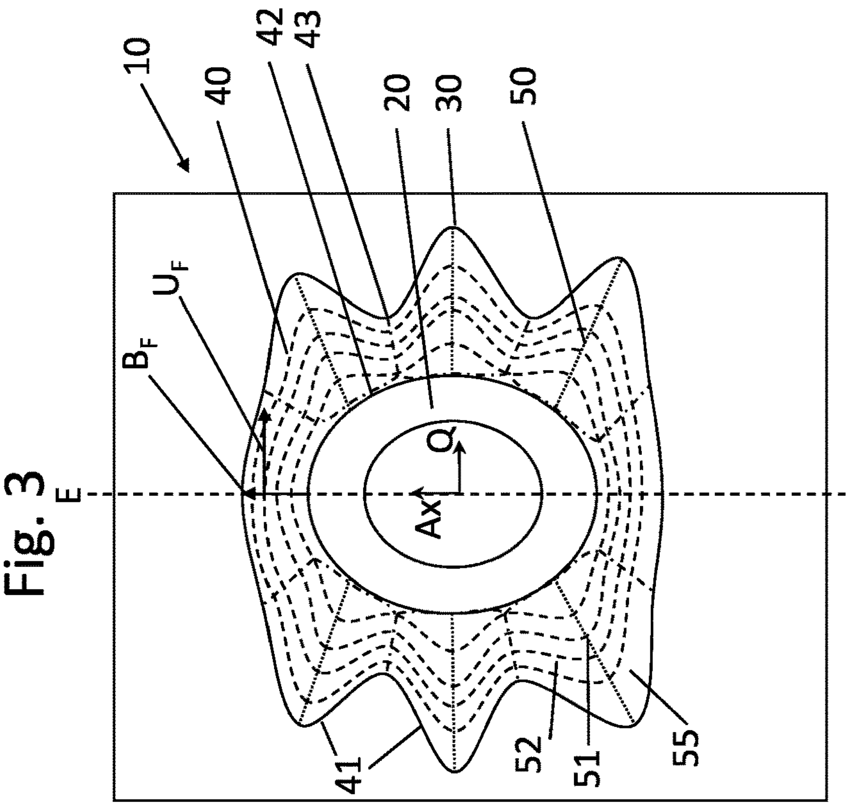
FIG. 3 shows a third exemplary embodiment of a connecting structure according to the present invention in a top view.
Figure 2:
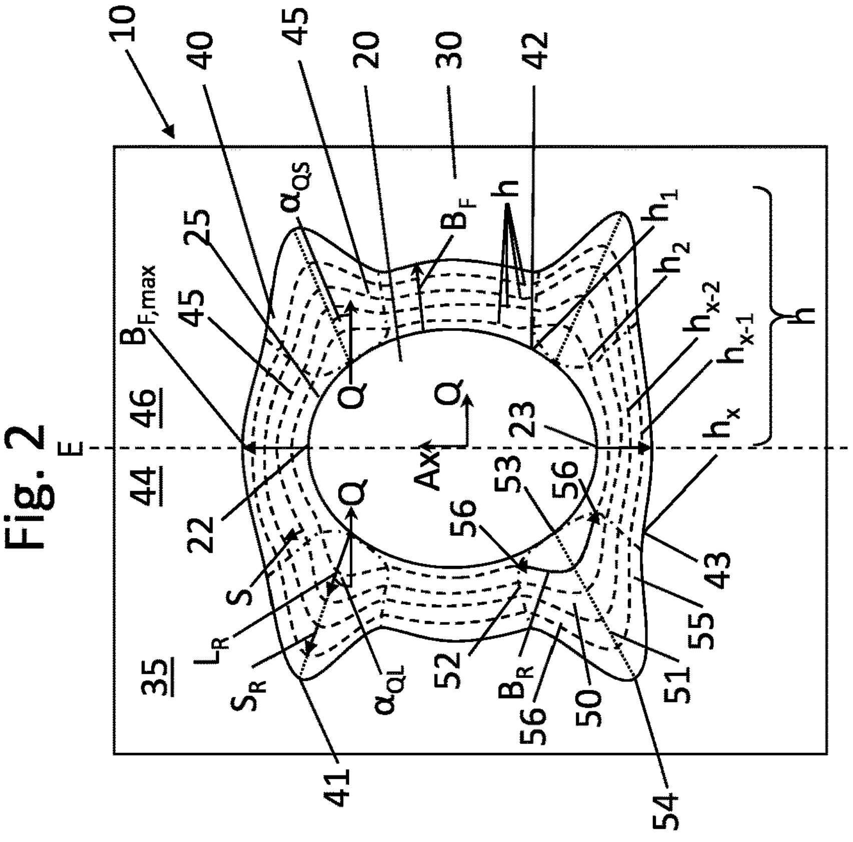
FIG. 2 shows a second exemplary embodiment of a connecting structure according to the present invention in a top view.

Line II-II shows the location of the top view used in FIGS. 2 and 3.

FIG. 2 shows a second exemplary embodiment of a connecting structure 10 according to the present invention in a top view, illustrating an elliptical strut 20, a rectangular wall element 30, and a fillet 40 that integrally joins strut 20 and wall element 30. Strut 20 is designed as a solid body. Fillet 40 encloses strut 20, and a beltlike profile of surface 45 of fillet 40 from strut 20 to wall element 30 is illustrated by multiple dashed circumferential lines $h_1$ through $h_x$, innermost circumferential line $h_1$ being the circumferential line closest to the observer, and outermost circumferential line $h_x$ being the circumferential line farthest from the observer. Situated in between are further circumferential lines $h_2$ through $h_{x-1}$ in an order from inward to outward at an increasing distance from the observer. An inner edge 42 of fillet 40, which delimits strut 20 and fillet 40, at the same time is first circumferential line $h_1$. Outermost circumferential line $h_x$ at the same time is second edge 43 of fillet 40, and adjoins wall element 30. At first edge 42, surface 45 of fillet 40 tangentially merges into a strut surface 25, and at second edge 43 tangentially merges into a wall element surface 35. Strut 20 has an axial direction Ax and a transverse direction Q, axial direction Ax coinciding with the first main direction of gas turbine 1. A front edge 22 and a rear edge 23 of strut 20 extend along strut 20 in axial direction Ax.

Connecting structure 10 and thus fillet 40 is divided into two sides 44, 46 by a meridian plane E. Four root sections 50 that are formed in each case by a ridge 56 are arranged, divided in pairs, on both sides 44, 46 of fillet 40, one pair of root sections 50 being provided in a front area, and one pair being provided in a rear area, of fillet 40.

Ridges 56 each include a comb 51, which is depicted by dotted lines. At their end-facing wall element 30, root sections 50 in each case form a protrusion 41, which in the present exemplary embodiment widens fillet 40 on surface 35 of wall element 30 by 100%. A power flow is thus advantageously displaced into the lateral area of connecting structure 10.

Comb 51 extends along lines, which in each case are lines between lined-up points with maximal curvature of circumferential lines h, and thus, of increased extension $S_R$, as explained in greater detail below. Root sections 50 are lengthened to a greater extent toward the outside than toward the inside, so that a stress in the areas of root sections 50 close to wall element 30 is advantageously displaced.

A course direction $L_R$ of comb 51 together with transverse direction Q of strut 20 forms a root angle $\alpha_{QL}$, which in the present exemplary embodiment is 20°. It may be advantageous to vary root angle $\alpha_{QL}$. In the present exemplary embodiment, root angle $\alpha_{QL}$ is constant.

As an example, a root width $B_R$ of root sections 50 that extends along a circumferential line $h_2$, transversely with respect to comb 51, is depicted, and in particular between the two points of maximal curvature 56 on circumferential line $h_2$ adjacent to comb 51. Further root widths $B_R$ may be defined for each root section 50 and along remaining circumferential lines $h_3$ through $h_x$. In the illustrated example, root sections 50 are minimally small at strut 20 at a starting point 53, i.e., of circumferential line $h_1$. Starting point 53 of root section 50 does not have to be situated on first edge 42. Root widths $B_R$ along a comb 51, taken together and connected, form a surface 55 of corresponding root section 50, and taken together at their ends also form root boundary lines 52, illustrated as dashed-dotted lines. Width $B_R$ of root section 50 is minimal at a tip 54 of root section 50. Tip 54 of root section 50 has a maximal distance, projected onto wall element 30, of a point on fillet 40 from strut 20. In the present exemplary embodiment, a tip 54 of root section 50 and a tip 41 of a protrusion of fillet 40 coincide.

A fillet width of fillet 40 may be defined based on lined-up fillet width lines $B_F$. A greater extension $S_R$ is present along comb 51 than along fillet width lines B of fillet 40, which likewise have a maximal curvature, but no root section. For the sake of simplicity, such fillet width lines B made up of points of maximal curvature of the circumferential lines are referred to as regular extreme lines $B_{F,max}$, and in the present exemplary embodiment are situated in front of and behind strut 20 in axial direction Ax due to an elliptical shape of strut 20. Strut 20 has the basic shape of an ellipse having two points of maximal curvature at the vertices of its main axis. This contour is continued at fillet 40 and maintained along width B of fillet 40, so that fillet width lines emanating from these points result in regular extreme lines $B_{F,max}$. In the present exemplary embodiment, the contour at this location could advantageously be compressed due to root sections 50 and thus the increased rigidity in the side area lateral to meridian plane E, so that approximately the same extension results as along fillet width lines B emanating from the vertices of the minor axis of the ellipse of strut 20. The curvature at these locations could occasionally be reduced, which has advantageous effects on the occurring stresses.

Extension $S_R$ of root sections 50 is increased compared to an extension S outside the root sections, in particular compared to these regular extreme lines $B_{F,max}$, and in particular, by a factor of 2 in the present case. This value results from increased extension $S_R$ along comb 51 and the reduced extension along regular extreme lines $B_{F,max}$. A power flow in the area of root sections 50 is thus advantageously increased, and a stress in the area of front edge 22 and of rear edge 23 of strut 20 is reduced.

FIG. 3 shows a third exemplary embodiment of a connecting structure according to the present invention. The third exemplary embodiment differs from the second exemplary embodiment in that in each case three mutually adjacent root sections 50 are situated in pairs lateral to meridian plane E. In addition, strut 20 is a hollow strut.

Figure 4:
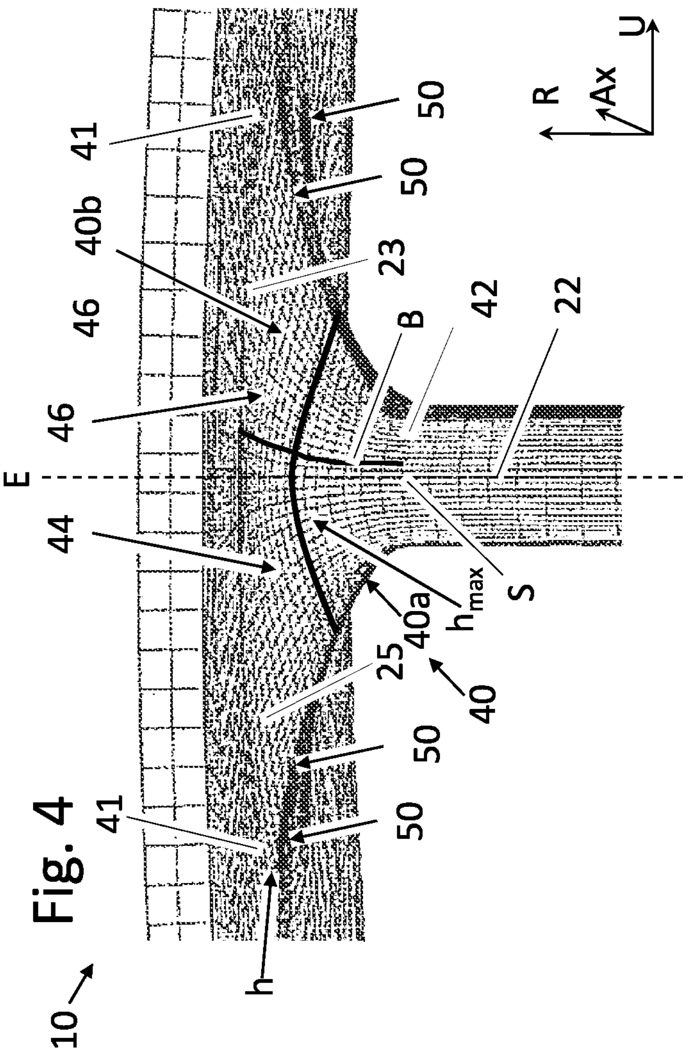
FIG. 4 shows a fourth exemplary embodiment of a connecting structure according to the present invention in a front view.

FIG. 4 shows a fourth exemplary embodiment of a connecting structure 10. Along front edge 22 of strut 20 that extends in parallel to radial direction R, a meridian plane E that divides connecting structure 10, and thus fillet 40, into two sides may be defined with the aid of an intersection point S of front edge 22 with first edge 42, and axial direction Ax. Two root sections 50 that have a positive influence on the rigidity of connecting structure 10, i.e., in the sense of lower material requirements at the area around front edge 22, are formed on each of the two sides of fillet 40. Root sections 50 are symmetrically situated in pairs with respect to meridian plane E.

Root sections 50 have a convex height profile along circumferential lines h. In the vicinity of strut 20, root sections 50 run out, and with fillet 40 tangentially merge into strut 20.

A circumferential line $h_{max}$ having a greatest curvature along all fillet width lines B of fillet 40 that intersect circumferential line $h_{max}$ divides fillet 40 into a first and second fillet portion 40*a*, 40*b*. An extension of second fillet portion 40*b* closer to the wall element along width lines B is greater than an extension of first fillet portion 40*a* closer to strut 20. In other words, fillet portion 40*b* facing wall element 30 advantageously has a flatter and wider design than first fillet portion 40*a* facing strut 20. The rigidity in second transition subarea 40*b* is thus advantageously increased, so that material may be saved at front edge 22 of strut 20 or in fillet 40.

Figure 5:
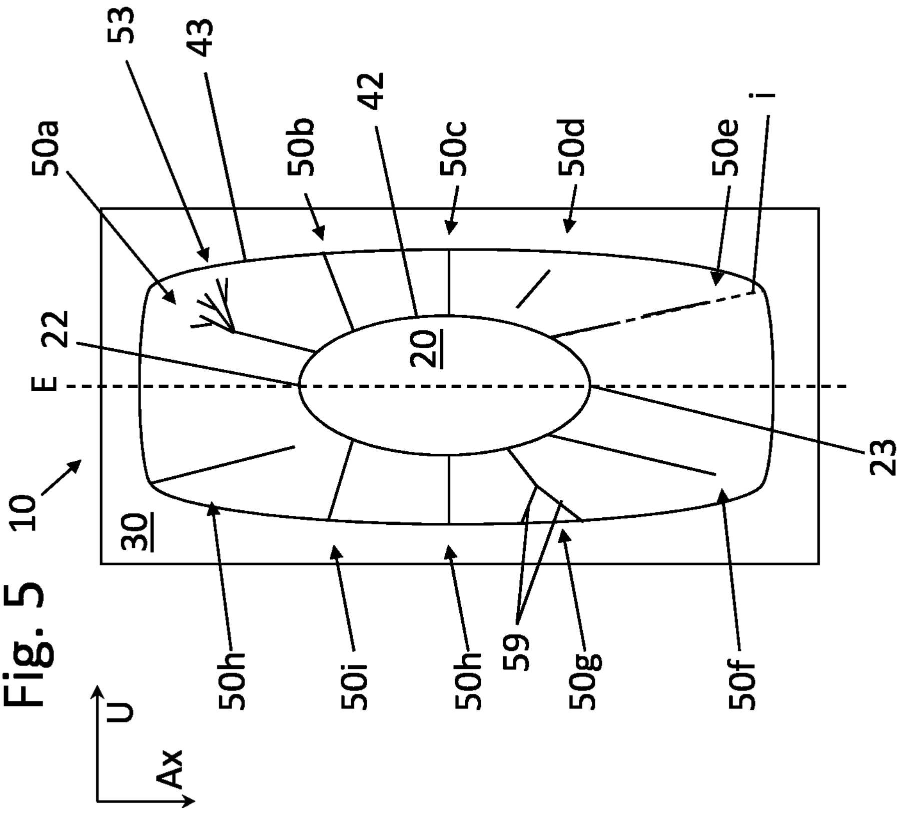
FIG. 5 shows, in a view from above, examples of possible positions and specific embodiments of the root section with reference to a schematic drawing.

FIG. 5 shows a schematic top view onto a connecting structure 10 with various examples of designs of root section 50. A meridian plane E that is spanned by an axial direction Ax and a front edge 22 of strut 20 divides connecting structure 10 into two sides. Beginning clockwise from the twelve o'clock position, the following embodiments are shown, it being possible for each of the root sections to be situated at any position:

- 50*a* is a front root section situated laterally to the right, which at its end 53 facing second edge 42 [sic; 43] has a plurality of branches in a plurality of root subsections
- 50*b* is a front root section situated laterally to the right and extending from first edge 42 to second edge 43
- 50*c* is a center root section situated laterally to the right and extending from first edge 42 to second edge 43
- 50*d* is a rear root section situated laterally to the right and spaced apart from first edge 42 and second edge 43
- 50*e* are two rear root sections situated laterally to the right, both extending along a width line i between first edge 42 and second edge 43
- 50*f* is a rear root section situated laterally to the left and extending from first edge 42 to second edge 43
- 50*g* is a rear root section situated laterally to the left and having two root subsections 59 in the direction of second edge 43
- 50*h* is a center root section situated laterally to the left and extending from first edge 42 to second edge 43
- 50*i* is a front root section situated laterally to the left and extending from first edge 42 to second edge 43
- 50*j* is a front root section situated laterally to the left and spaced apart from first edge 42 and extending to second edge 43

Root sections 50*b* and 50*h* as well as 50*c* and 50*g* form root section pairs that are situated symmetrically with respect to meridian plane E.

FIGS. 6*a* through 6*c* show examples of load positions in preferred exemplary embodiments.

In a fourth preferred exemplary embodiment in FIG. 6*a*, two local highest load positions 61, 62 at the front and rear in the area of front edge 22 or rear edge 23, respectively, of strut 20 have occurred and are correspondingly shown. Root sections 50 are situated at a distance from these local highest load positions, and in particular lateral to strut 20. Provided on each side of fillet [sic; strut] 20 are three root sections 50 that are situated in pairs, symmetrically with respect to root sections 50 on the opposite side of fillet 40. Strut 20 is a hollow strut.

In a fifth exemplary embodiment in FIG. 6*b*, compared to the fourth exemplary embodiment, in addition further local highest load positions 63 have occurred and are correspondingly shown. These are high notch stresses in the lateral area of strut 20 or of fillet 40. Root sections 50 are situated essentially centrally between load positions 61 through 63. The greatest reduction in the elastic deformation in the load case is advantageously achieved in this way.

In the sixth exemplary embodiment in FIG. 6*c*, a plurality of local highest load positions 64, 65 in an area of fillet 40 facing wall element 30 have occurred and are correspondingly shown. In this case, a particular branching of root section 50 into root subsections 59 is the preferred approach for reducing the elastic deformation at or around these load positions 64, 65. Local highest load positions 64, 65 may be expected to have differing intensities of elastic deformations, and increased rigidities of root sections 50 are accordingly adapted to these load cases, in particular the extension, a height of ridge 56, and/or a thickening of root sections 50. For example, local load position 65 in a corner area of fillet 40 may be expected to have a greater elastic deformation than local load position 64, which is situated closer to strut 20.

In general, it may be provided that the extension and/or a thickening of root sections 50 and/or of root subsections 59 is designed to be proportional to the expected elastic deformation at closest load position 61, 62, 63, 64, 65.

FIG. 7 shows a front view of the connecting structure with a plurality of cross-sectional planes $Q_1$ through $Q_x$ which intersect the connecting structure, and which in the present illustration extend normally with respect to longitudinal axis L of strut 20. If longitudinal axis L has an angle with respect to wall element 30 that differs from a right angle, it is practical to appropriately correct the orientations of cross-sectional planes $Q_1$ through $Q_x$. Cross-sectional planes $Q_1$ through $Q_x$ intersect fillet 40, and form circumferential lines $h_1$ through $h_x$ at the intersection edges. All adjacent circumferential lines, projected relative to one another onto the longitudinal extension of strut 20, have same projected distance 71 as all other adjacent circumferential lines. This projected distance 71 is height gradation 71 of the grid. The magnitude of an extension S, $S_R$ is locally defined between two adjacent circumferential lines h that intersect comb 51 or a fillet width line $B_F$, and is computed from the square root of a sum of the square of a distance 72, projected onto a circumferential plane, between two intersection points of adjacent circumferential lines h along a fillet width line $B_F$ or of comb 51, and the square of height gradation 71.

LIST OF REFERENCE SYMBOLS

1 gas turbine
2 turbine intermediate housing
3 bearing seal housing
10 connecting structure
20 strut
22 front edge of the strut
23 rear edge of the strut
25 strut surface
30 wall element
35 wall element surface
40 fillet
40*a* first fillet portion facing the strut
40*b* second fillet portion facing the wall element
41 protrusion
42 first edge
43 second edge
44 first side of the fillet
45 surface of the fillet
46 second side of the fillet
50 root section
51 comb
52 root boundary line
53 first end of the root section
54 tip of the root section
55 surface of the root section
56 ridge
59 root subsection
61 local highest load position
62 local highest load position
63 local highest load position
64 local highest load position
65 local highest load position
Ax axial direction
R radial direction
U circumferential direction
S extension of the fillet
$B_F$ fillet width
$B_{F,min}$ minimal fillet width
$L_R$ course direction of the comb
$B_R$ root width
$S_R$ root extension

What is claimed is:

1. A connecting structure for load transfer in a gas turbine, the connecting structure comprising:

a strut; and at least one wall element, the strut at one end being integrally joined to the wall element, and the strut and the wall element being enclosed by a fillet, at least in areas, and integrally joined to same, at least one root section being situated on the fillet;

the at least one root section numbering three or four root sections, each root section formed by a ridge with a comb, and each root section extending from the strut to the wall element, at least two successive root sections of the three or four root section extending with respect to one another at an angle in the range of 80° to 170°.

2. The connecting structure as recited in claim 1 wherein the fillet has a width on the wall element and the strut surface, the root section widening the fillet on a wall element surface of the wall element by at least 5%, or the root section widening the fillet on the strut surface of the strut by at least 5%.

3. The connecting structure as recited in claim 1 wherein the extension of the comb in an area of the root section closer to the wall element is greater than in an area of the root section closer to the strut.

4. The connecting structure as recited in claim 1 wherein the comb has a course direction and a root angle with respect to a transverse direction transverse to a longitudinal direction of the strut, and the root angle being in a range of −80° to +80°.

5. The connecting structure as recited in claim 1 wherein the root section is situated at a distance from a local highest load position at the strut, at the wall element.

6. The connecting structure as recited in claim 1 wherein the fillet is divided into two sides by a separating plane and the at least one root section is situated completely on one of the two sides of the separating plane.

7. The connecting structure as recited in claim 6 wherein the at least one root section includes a plurality of root sections, including a first root section of the plurality of root sections situated on one side of the separating plane and a second root section of the plurality of root sections situated on the other side of the separating plane.

8. The connecting structure as recited in claim 1 wherein the strut at one end opposite from the end is integrally joined to a further wall element and is designed, intended, or suited for load transfer between the wall element and the further wall element.

9. A gas turbine comprising the connecting structure as recited in claim 1.

* * * * *